Feb. 22, 1955     T. W. WINSTEAD     2,702,411
METHOD FOR FORMING AND EMBOSSING THERMOPLASTIC MATERIALS
Filed Sept. 15, 1950     2 Sheets-Sheet 1
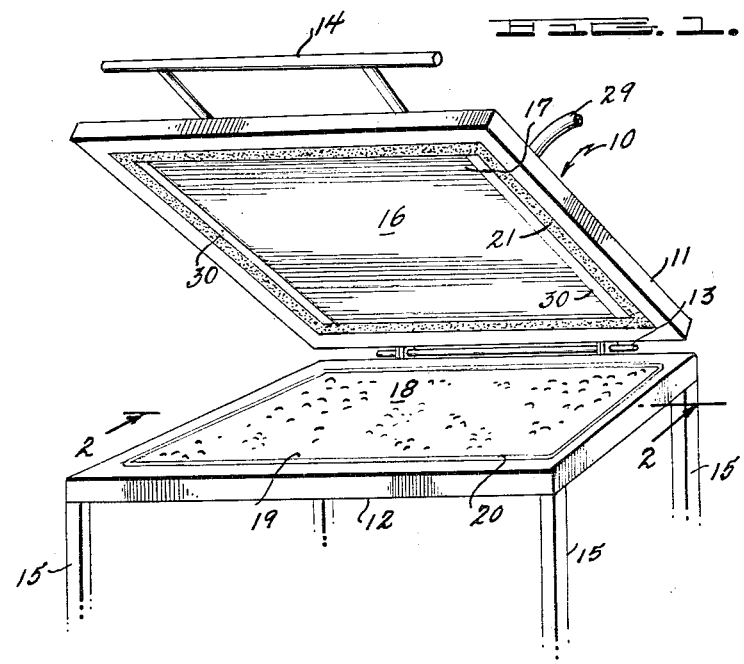
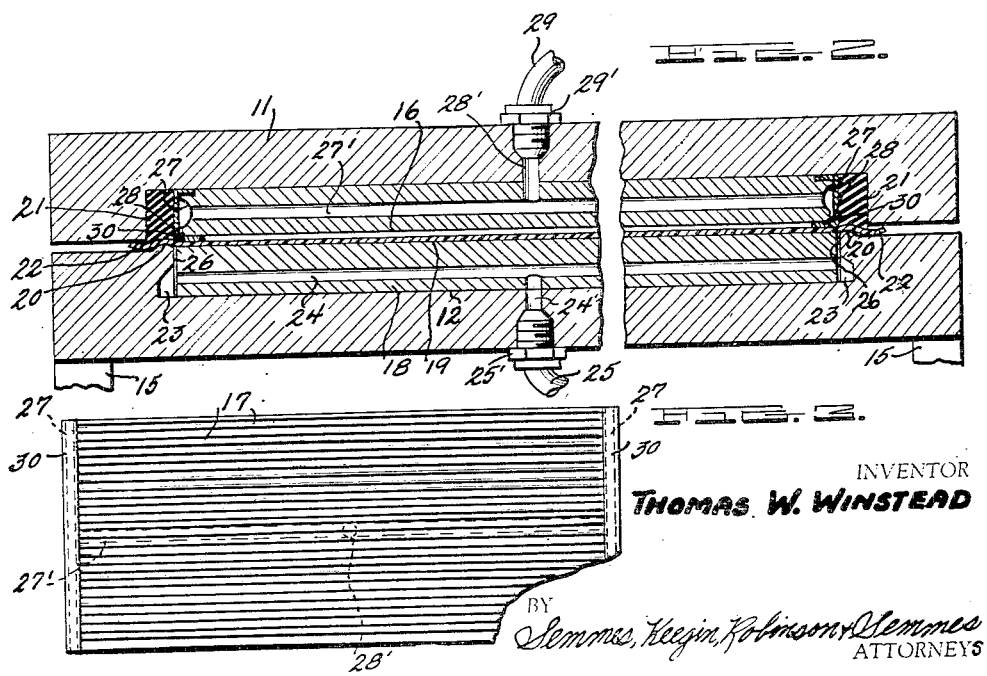
INVENTOR
THOMAS W. WINSTEAD Feb. 22, 1955 T. W. WINSTEAD 2,702,411
METHOD FOR FORMING AND EMBOSSING THERMOPLASTIC MATERIALS
Filed Sept. 15, 1950 2 Sheets-Sheet 2
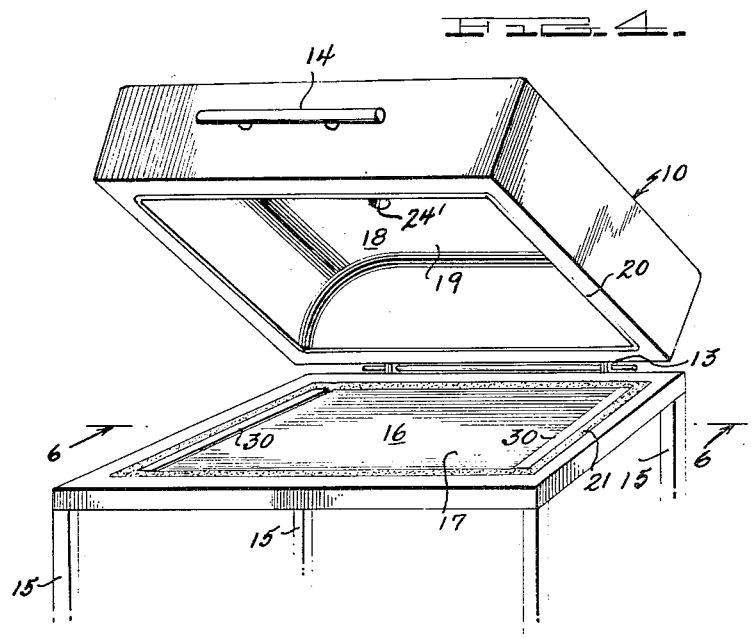
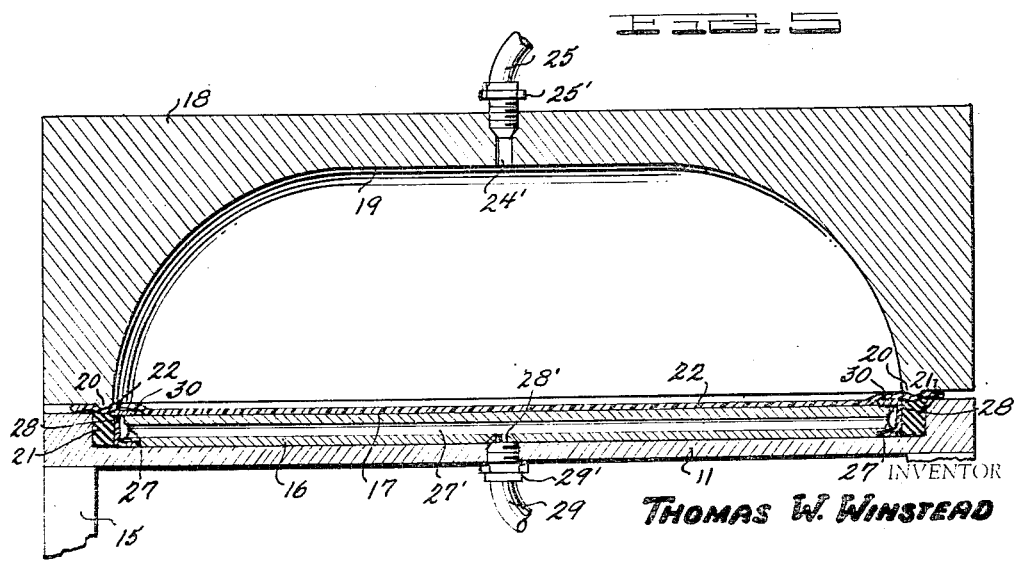
INVENTOR
THOMAS W. WINSTEAD
ATTORNEYS United States Patent Office 2,702,411
Patented Feb. 22, 1955

2,702,411

METHOD FOR FORMING AND EMBOSSING THERMOPLASTIC MATERIALS

Thomas W. Winstead, Baltimore, Md.

Application September 15, 1950, Serial No. 185,044

10 Claims. (Cl. 18—56)

This invention relates to forming and embossing of thermoplastic materials and has specific reference to an improved method for working thermoplastic film or sheeting to produce deep hollow forms and/or to reproduce designs in fine detail and of great depth on the surface of said materials.

Heretofore, various methods have been developed and put into practice for forming thermoplastic film and sheeting of both the rigid and non-rigid type. In the forming of rigid thermoplastic sheeting, it is common practice to work same by heating the sheets by diverse means such as in an oven, in an infra red heating apparatus, or by heated liquid, i. e., any system of convection or radiation heating, then transferring the heated sheet in a semi-rigid state to a forming jig whereby the use of dies, male and female, or either one, the sheet is formed to the desired shape and allowed to cool. In some instances, the hot thermoplastic sheeting is blown or sucked against the mold, and in others a male die is used to force the sheeting against a female mold. Although this method is satisfactory for relatively thick sheeting, i. e., rigid sheeting, it is quite slow and subject to many rejections because of limitations in convection and radiation heating, and also because of the problem of transferring the heated sheets from the heating apparatus to the forming jig.

In the forming of flexible thermoplastic sheeting or film, the method above described cannot be used at all, the reason for this being that it is practically impossible to heat a large sheet of thermoplastic material which is non-rigid at one place and then pick it up and transfer it to another without considerable wrinkling and distortion. In short, though it can be done, the handling of flexible film and sheeting in such an operation is entirely impractical.

In the embossing of flexible thermoplastic film or sheeting, standard practices call for the use of either a rotary machine if the embossing is relatively light or a press type machine if the embossing is to be deeper. Although the rotary method is a fast and an economical one, it is limited to the light embossing of the very exterior of the surface only. If the material were heated enough to enable deep embossing, it would run on the rolls. Press-type embossing is much slower and therefore much more costly, and it is also limited in the depth of the embossing which may be accomplished. To speed up the operation of press embossing, it is normal to use a multi-platen press and a large number of molds. Since a single operating cycle is 15 to 30 minutes, the use of a multi-platen press is the only way to speed up the operation. Even then, however, the process is relatively slow.

It is, therefore, a primary object of this invention to provide a method for forming and embossing thermoplastic film and sheeting, both rigid and non-rigid, which is simple, fast, versatile and economical.

Another object of this invention is to provide a method for direct conductive heating of thermoplastic film or sheeting to speed up the heating process in forming and embossing operations.

Yet another object of this invention is to provide a method for heating thermoplastic material at the same location where it is to be formed or embossed.

Another object of this invention is to provide a method for the purpose described whereby flexible thermoplastic material is drawn into direct contact with a heating surface after all the air has been eliminated from the space between the material and the heating surface.

Another object of this invention is to provide a method for the purpose described whereby heated flexible thermoplastic material is forced onto an embossing or forming surface from which all air has been eliminated.

Another object of this invention is to provide a method for the purpose described whereby vacuums are drawn in sequence on alternate sides of a piece of flexible thermoplastic material to be embossed or formed in order to accomplish the following steps: Eliminate virtually all air between the material and a heating surface, draw the material into direct contact with the heating surface, eliminate virtually all air from between the material and an embossing or forming surface, and instantaneously forcing the material onto said surface.

Still another object of this invention is to provide a method for obtaining deep impressions of high detailed quality in thermoplastic materials by forcing the heated material instantaneously from a heating surface to a cold mold.

A further object of this invention is to provide a method for the purpose described including a double vacuum, one on each side of the material to be treated, for closing a light forming jig.

A still further object of this invention is to provide a method for forming deep hollow articles such as a hemisphere or baby's bath from thermoplastic sheeting without the usual thinning down at the deepest point of the draw by controlling the thickness distribution in the finished product.

With these and other objects and advantages in view, which will become more apparent during the course of the following description, the invention consists in the features and combinations hereinafter set forth.

In order to make the invention more fully understood, preferred embodiments thereof have been made the subject of illustration in the accompanying drawings in which:

Figure 1 is a perspective view of one form of embossing machine for carrying out the method of applicant's invention;

Figure 2 is a cross section of the machine of Figure 1 in closed position and taken along the line 2—2 thereof;

Figure 3 is a top plan view of the heating surface or hot plate of the machine of this invention;

Figure 4 is a perspective view of one example of a forming machine for carrying out the method of applicant's invention; and Figure 5 is a cross section of the forming machine of Figure 4 in closed position and taken along the line 6—6 thereof.

The present invention in its briefest form consists of a method of forming and embossing thermoplastic material which comprises placing the material between a heating surface and a forming or embossing surface, drawing the material into direct contact with said heating surface by vacuumizing the space between the surface and the material, creating a vacuum between the material and said surface, releasing the vacuum between the material and the heating surface and forcing the material onto said embossing surface so that the material will take the shape or impressions thereof. It is contemplated that the vacuums created on both sides of the thermoplastic sheet be utilized to eliminate all the air from between the material and the heating surface and from between the material and the embossing surface so that no bubbles or streaks will appear in the finished product. It is also a part of this invention to utilize a double vacuum, i. e., creating a vacuum on both sides of the thermoplastic material at the same time to apply closing pressure to a forming jig containing the heating surface and the forming or embossing surface. An additional step is provided for fixing the shapes and impressions in the treated material by cooling the material instantaneously as it contacts the forming or embossing surface.

In carrying out the method of the present invention, which is particularly adapted to the embossing of flexible thermoplastic material in the form of films or sheeting, three basic steps are involved: (1) a heating step, (2) a transferring step, and (3) a forming and cooling step. The heating step is a most important phase of this process.

This step is accomplished by sucking or blowing a sheet or film of flexible thermoplastic material to be worked against a heating surface which is located directly adjacent a mold. The material is then held against this heating surface by a differential in pressure for however long it is necessary to heat it. The transfer of heat from the heating surface to the material is extremely rapid as it is direct conductive heating, an extremely fast means of heating. The temperature of the heating surface depends upon the type of film or sheeting being used, but normally should range between 250° F. and 400° F. In the use of the very thin films, such as .001 inch to .002 inch the heating time is almost instantaneous. In the use of thermoplastic sheeting in the range of .02 to .04 inch somewhere between 5 to 10 seconds is required for properly heating the material.

One of the main problems in heating by this method is the elimination of air between the thermoplastic material and the heating surface. The elimination of air is absolutely essential in the deep embossing of flexible thermoplastic materials in order to ensure intimate contact between the heating surface and the material at all points. Besides making for more uniform and faster heating the elimination of air avoids all bubbles and streaks in the finished product due to unheated areas of the material failing to take the impressions of the embossing surface of the mold. In forming operations, the elimination of all air is essential to ensure uniform thickness in the material of the finished product.

The elimination of air has been accomplished by various methods, depending upon the particular application and the amount of heat required. In some cases, a metal screen or perforated sheeting has been used on the heating surface to allow the air to vent through to a bleeding point and the material is drawn into direct contact with the screen which in turn is placed firmly against the heating surface. The screen method is not practical because the material sticks to the screen as well as taking the impressions thereof. Another method is to scribe a plate forming the heating surface with various small lines leading to a central bleeding point, which allows the air to escape and the film to come into contact with the plate. This method is not too good because the plate surface should be smooth in order to prevent impressions being made on the thermoplastic material being heated. Yet another method is to have a convex or concave surface formed on the plate to allow the air to be swept from the center out or from the outer edge in to a central bleeding point. However, the best method for the elimination of air between the thermoplastic material and the heating surface is to have the surface of the plate rippled or grooved very gently along its length to form a surface similar to that of a wash board with the ripples leading to a central bleeding point which allows the air to escape.

Once the material has been sucked tightly against the surface of the heating plate, it can be heated to any temperature required without wrinkling or distortion as it is being held firmly in place by the differential in air pressure on its two surfaces. In other words, if a vacuum is used, a pressure of roughly 15 pounds per square inch forces the material against the plate and holds it there. This is particularly convenient where the registration of printing with the embossed material is desirable.

The second basic step of the method of this invention is the transferring step, which follows the heating step. After the heating step is completed, air is introduced back through the bleeding surface of the plate, which immediately peels the heated material from the plate and begins to carry it toward the forming or embossing surface. Whether the said surface is deep and large, as in the case of a baby bath, or simply detailed but very shallow as in the case of embossing, the material smacks against the surface of the form or mold, and because of its hot fluid condition, takes on whatever shape or detail the mold itself may have. This step of the invention can be accomplished either by sucking from the mold side, or by blowing from the plate side, or a combination of both. Whether the mold is deep or shallow this step of the invention can be accomplished in less than a second, or no more than 1 to 2 seconds.

The third step of this invention is the cooling step. The surface of the mold or form is normally made of metal because of its good heat conductivity and is normally water-cooled. As soon as the heated material is transferred and hits the cold surface of the mold, it begins to cool. The time required is dependent upon the thickness of the material, the temperature to which it has been heated, and the degree of coolness of the mold. However, the mold can be hot at the time of forming and subsequently cooled. In thin films the cooling is almost instantaneous, whereas in thicker films, it requires several seconds. In either event, the cooling takes place rapidly because of the direct contact of the plastic throughout its surface with the mold. After the cooling step is completed, the machine is opened up and the material can be removed.

Although the operation can be performed as described above, in some cases the trapping of air on the plate side as well as on the mold side becomes a particular problem. With this in mind, the process has been developed further in order to eliminate this problem. Although the mold may be on the top and the plate on the bottom, or vice versa, it has been found convenient where possible to have the mold on the bottom side of the machine. The material is then placed on the cold mold, and the plate is brought down to clamp the material around its edges. At this point a vacuum is sucked on the mold side thereby drawing the material against its surface. This can be done, of course, only if the mold is relatively shallow. Once the material is against the mold and held there by the vacuum pressure, a vacuum is then drawn on the plate side without releasing the vacuum on the mold side. Of course, this leaves no difference of pressure and the material falls on the mold by gravity. By doing this, the air can be eliminated completely from the surface of the plate and the bleeding problem becomes simplified. Actually, if a perfect vacuum could be sucked, there would be no airtrapping problem at all and a smooth flat plate could be used for the heating source. Also, if the thermoplastic material were heated in a separate apparatus, the material could be placed in an enclosed space adjacent the mold and held away from it by a vacuum on the side of the material away from the mold prior to carrying out the forming step according to the method of the next paragraph.

As soon as the vacuum has been created on the plate side and held on the mold side, it is then released on the mold side to allow air to enter and force the material against the plate. The heating cycle is then carried through normally. Just before the material is hot enough to form, a most important problem in the process arises, and that is eliminating all air which might be trapped on the mold side. This problem is overcome by the following novel step: A vacuum is again sucked on the mold side, while still holding it on the plate side, in order to eliminate air again in the cavities of the mold. Once this has been accomplished, the vacuum on the plate side is then released, and atmospheric air, or air under pressure is allowed to enter and force the hot material against the mold without trapping air. This step is carried out instantaneously to smack the sheeting down on the mold in a fraction of a second and force the hot sheet into the fine crevices of the cold mold. This is the most important feature of the whole process. Without this vacuum no matter how much pressure there is on the plate side of the material, there is so much air trapped on the mold surface that it is impossible to make deep impressions with required detail and without defects on every sheet of material produced.

Although this process of double sucking may sound somewhat involved, it is actually extremely simple and requires no more equipment that if it were not used. Applicant has found that it enables him to form materials against molds which otherwise would create an insurmountable problem as far as air trapping is concerned. It also assures that the material will go against the plate of the heating surface satisfactorily without trapping air.

As previously stated, this process is extremely useful where thin film or flexible sheeting is being used. However, because of its simplicity and its direct approach to the heating problem, it works very satisfactorily and far more quickly than existing methods on rigid material as well. Whereas extremely high pressures are normally required to emboss material with light surface patterns, applicant has found that a pressure of 50–400 lbs. sq. in. air pressure is adequate and will pick up every detail in the mold. In many cases, as little as 1 to 2 pounds is sufficient. Because of these relatively low pressures, it is possible for applicant to use relatively light and simple equipment.

Referring to the drawings, Figure 1 shows an embossing machine or jig, generally designated as 10, having an upper backing member 11 and a lower backing member 12. A hinge 13 is provided at the rear of the machine connecting members 11 and 12 along their rear edges. A handle 14 is provided on the upper backing member 11 for raising and lowering said member. Legs 15 are provided for supporting the machine at a convenient height above the floor. Positioned within the upper backing member 11 is a heating surface or hot plate 16 which may, for example, be heated by having electric coils embedded therein. In its preferred form this plate 16 has a shallow rippled surface formed by ridges 17 with the ridges running in parallel relation from one side of the plate to the other. A mold 18 is embedded and secured in the lower backing member 12 and has an embossing surface 19. A ridge 20 in the backing member 12 surrounds the mold surface 19 and a rubber gasket 21 surrounding the heating surface in the backing member 11 coacts therewith when the jig is closed to form an air-tight seal.

Figure 2 shows the details of the embossing machine when in closed position. In this figure, a thermoplastic sheet 22 is shown placed over the mold 18 with the heating surface 16 closed over the top of the thermoplastic sheet. The edges of the plastic material are gripped between the gasket 21 and the ridge 20. It will be noted that a space is thus formed between the heating surface and the mold surface, which is air-tight. As close as the surface of the heating surface is to the surface of the mold, there is some slight free space left therebetween even when the thermoplastic material is in position to be molded. A channel 23 at the right and left ends of the mold 18 and below the surface thereof leads through channel 24 to a central opening 24' in the backing member 12 for drawing a vacuum on the surface of the mold 18. Leading to a vacuum pump (not shown) is a pipe 25 which is screwed into the opening and locked in place by nuts 25'. Along the right and left edges of the mold surface the backing member 12 is spaced from the mold 18 to provide a passage 26 for the passage of air when drawing the vacuum on the mold surface. In the upper part of the machine, at the right and left ends of the heating surface, an air and vacuum channel 27 is provided. Bleeder strips 30 along the right and left ends of the surface ridges 17 are spaced from the heating surface to provide passages 28 so that air may be passed between the surface of the heating surface and the channel 27. The vacuum is drawn from the channel 27 by sucking air through a transverse channel 27' in the backing member 11 and out through a central opening 28' and pipe 29 to a pump (not shown). Pipe 29 is screwed into the openings 28' and locked in place by nut 29'. The bleeder strips 30 running along the edges of the heating surface at each side and at right angles to the ridges formed thereon allow a vacuum to be drawn between the heating surface and the thermoplastic material when the material actually touches the top edge of the ridges but before the material has completed contact with the entire surface of the heating surface, i. e. with the surface of the grooves formed between the ridges. The air is drawn along the grooves formed between the ridges toward the bleeder strips and beneath the bleeder strips down through passages 28 into the channels 27 and 27' and out through the pipe 29. In forcing air under pressure between the heating surface and the thermoplastic material, the air is led in through pipe 29, opening 28', channels 27' and 27, and passage 28, beneath the bleeder strip 30 and out along the grooves formed by the ridges 17. It should be noted that pressure or other means (not shown) are applied to hold the jig in closed position while air under pressure is introduced into the jig; otherwise the jig would blow open.

Figures 4 and 5 show one example of a forming machine for carrying out the method of applicant's invention. This machine is basically similar to that used in embossing operations. However, the mold is positioned above the heating surface. This is desirable so that flexible thermoplastic sheeting or film may be positioned on the flat surface of the heating surface before the machine is closed. If the deep mold were below the heating surface and flexible thermoplastic material would fall into the hole formed by the mold and there would be difficulty in placing it properly within the machine. Furthermore, no backing member is provided for the mold since no more than atmospheric pressures are required in a forming operation. Since the air entrapping problem is not so difficult on the mold side in the case of deep forming as it is in the case of embossing, it is only necessary to have the central air outlet 24' in the top central portion of the mold. The side channels and passages of the mold of the embossing machine are dispensed with. Heating means can easily be provided in the machine so that deep hollow objects which are formed will not have the usual thinning down at the deepest point of the draw. For example, a temperature gradient might be imposed on the plate of the heating surface so that the edges of a sheet of thermoplastic material are heated more than the center. By this controlled heating, the sheet will stretch more where it is heated most.

While the invention has been described with reference to particular embodiments, it is contemplated that modifications thereof may be made without departing from the spirit of the invention. The invention is not limited to the form or uses shown, except to the extent indicated in the appended claims, which are to be interpreted as broadly as the state of the art will permit.

I claim:

1. The method of embossing thermoplastic material which comprises placing the material in spaced relation between a heating surface and an embossing surface creating a vacuum in the space between the material and the heating surface to draw said material toward said heating surface, creating a vacuum between the material and the embossing surface, and subsequently releasing the vacuum between the material and the heating surface to force the material onto the embossing surface so that the material will take the impressions thereof.

2. The method of embossing thermoplastic material which comprises placing the material between a heating surface and an embossing surface, creating a vacuum in the space between the material and the heating surface to suck said material into direct contact with said surface, eliminating all air which might otherwise be trapped therebetween, creating a vacuum between the material and the embossing surface while still maintaining the vacuum between the material and the heating surface, and subsequently releasing the vacuum between the material and the heating surface to force the material onto the embossing surface so that the material will take the impressions thereof.

3. The method of embossing thermoplastic material which comprises placing the material in spaced relation between a heating surface and an embossing surface, creating a vacuum in the space between the material and the heating surface to suck said material into direct contact with said heating surface, eliminating all air which might otherwise be trapped therebetween, creating a vacuum between the material and the embossing surface while still maintaining the vacuum between the material and the heating surface, eliminating all air which might be trapped in cavities in the embossing surface, and subsequently releasing the vacuum between the material and the heating surface for forcing the material onto the embossing surface so that the material will take the impressions thereof.

4. The method of embossing thermoplastic material which comprises placing the material between a heating surface and embossing surface, creating a first vacuum between the material and the embossing surface, then creating a second vacuum between the material and the heating surface to eliminate all air which might otherwise be trapped therebetween, subsequently releasing the first vacuum to force the material into direct contact with the heating surface, recreating the first vacuum while yet maintaining the second vacuum to eliminate air which might be entrapped on the embossing surface, and subsequently releasing the second vacuum to force the heated material into direct contact with said embossing surface so that the material will take the impressions thereof.

5. The method of embossing thermoplastic material which comprises placing the material between a heating surface and embossing surface, creating a first vacuum between the material and the embossing surface, then creating a second vacuum between the material and the heating surface to eliminate all air which might otherwise be trapped therebetween, releasing the first vacuum to force the material into direct contact with the heating surface, recreating the first vacuum while yet maintaining the second vacuum to eliminate air which might be entrapped on the embossing surface, releasing the second vacuum, and introducing air under pressure between the material and the heating surface to instantaneously force the heated material into direct contact with the embossing surface so that the material will take the impressions thereof.

6. The method of embossing thermoplastic material which comprises placing the material in spaced relation between a heating surface and a relatively cool embossing surface, creating a vacuum in space between the material and the heating surface to draw said material into direct contact with said heating surface, eliminating all air which might otherwise be trapped therebetween, creating a vacuum between the material and the embossing surface, eliminating all air which might be trapped in cavities in the embossing surface, and releasing the vacuum between the material and the heating surface for forcing the material onto the embossing surface so that the material will take the impressions thereof, said impressions being fixed on said material instantaneously because of the cool embossing surface.

7. The method of embossing thermoplastic material which comprises placing the material between a heating surface and embossing surface, creating a first vacuum between the material and the embossing surface, then creating a second vacuum between the material and the heating surface to eliminate all air which might otherwise be trapped therebetween, releasing the first vacuum to force the material into direct contact with the heating surface to heat the material, recreating the first vacuum while yet maintaining the second vacuum to eliminate air which might be entrapped on the embossing surface, and releasing the second vacuum to force the heated material into direct contact with said embossing surface so that the material will take the impressions thereof, and maintaining the embossing surface cool at all times to instantaneously fix impressions in the material and to allow removal of said material from said surface immediately thereafter.

8. The method of embossing thermoplastic material which comprises placing the material on a cooled embossing surface having a heating surface adjacent thereto, creating a first vacuum between the material and the embossing surface, then creating a second vacuum between the material and the heating surface to eliminate all air which might otherwise be trapped therebetween, releasing the first vacuum to force the material into direct contact with the heating surface to heat the material, recreating the first vacuum while yet maintaining the second vacuum to eliminate air which might be entrapped on the embossing surface, releasing the second vacuum to force the heated material into direct contact with said embossing surface so that the material will take the impressions thereof, said cooled surface fixing said impressions on said material and allowing removal of said material immediately thereafter.

9. The method of embossing thermoplastic material which comprises placing the material between a heating surface and embossing surface, creating a first vacuum between the material and the embossing surface, then creating a second vacuum between the material and the heating surface to eliminate all air which might otherwise be trapped therebetween, releasing the first vacuum to force the material into direct contact with the heating surface to heat the material, recreating the first vacuum while yet maintaining the second vacuum to eliminate air which might be entrapped on the embossing surface, utilizing said two vacuums to exert pressure to close said heating surface toward said embossing surface so that a space is defined therebetween being continuously sealed along the limits thereof, holding said heating surface and said embossing surface together while in the closed position, releasing the second vacuum, and introducing air under pressure between the material and the heating surface to instantaneously force the heated material into direct contact with the embossing surface so that the material will take the impressions thereof.

10. A method of forming relatively deep shapes and embossing surface detail on thermoplastic material which comprises placing the material between a heating surface and a combination forming and embossing surface, creating a vacuum in the space between the material and the heating surface to suck said material into direct contact with said surface to heat the material, creating a vacuum between the material and the forming and the embossing surface, and releasing the vacuum between the material and the heating surface to instantaneously force the heated material into the forming and embossing surface so that the material will take the shape and impressions thereof.

References Cited in the file of this patent

UNITED STATES PATENTS

| | | |
|---|---|---|
| 2,120,328 | Ferngren | June 14, 1938 |
| 2,493,439 | Braund | Jan. 3, 1950 |
| 2,513,785 | Browne | July 4, 1950 |

OTHER REFERENCES

Greene, "New Vacuum Technique," Plastics, June 1944, pp. 22–25.